United States Patent Office 3,365,578
Patented Jan. 23, 1968

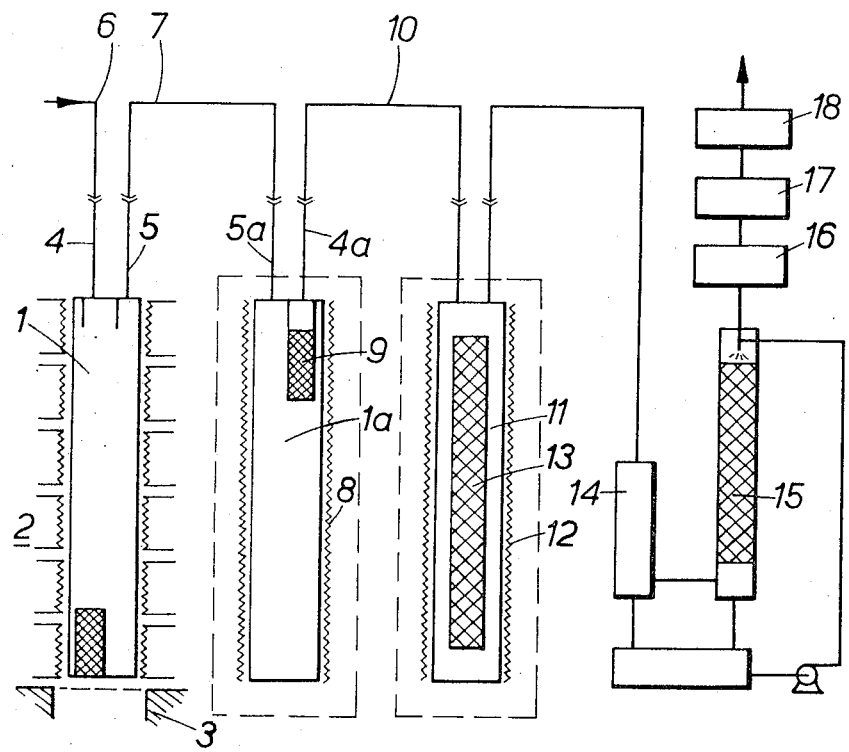

3,365,578
GLASS COMPOSITION COMPRISING RADIOACTIVE WASTE OXIDE MATERIAL CONTAINED WITHIN A STEEL VESSEL
John Roger Grover, Tilehurst, Reading, and Alan David Jones, Strood Green, Betchworth, England, assignors to United Kingdom Atomic Energy Authority, London, England
Continuation-in-part of application Ser. No. 299,835, Aug. 5, 1963. This application Aug. 17, 1965, Ser. No. 480,432
Claims priority, application Great Britain, Aug. 10, 1962, 30,847/62; Aug. 20, 1964, 34,182/64
2 Claims. (Cl. 250—106)

ABSTRACT OF THE DISCLOSURE

The invention relates to glass articles useful as sources of radioactivity or as means to dispose of radioactive waste. Waste oxides derived from the radioactive effluent obtained in the processing of uranium metal fuel irradiated to a burn-up of at least 3000 mwd./t. are incorporated in glass compositions comprising sodium phosphate and additional constituents such as ferric oxide, silica, lead oxide and alumina. The glass has very good leach properties and does not corrode its steel container.

---

This application is a continuation-in-part of our prior co-pending application Ser. No. 299,835 filed Aug. 5, 1963 and now abandoned.

The present invention relates to a new composition of matter, more particularly a radioactive composition of matter, and to a new article of manufacture containing the same.

According to the present invention there is provided a composition of matter which comprises a fused glass having a melting point in the range 850° C. to 1100° C. and consisting essentially of glass forming oxides and from 20 to 50% by weight of waste oxides as hereinafter defined.

The term "melting point" has no real significance in respect of glasses, as will be appreciated, but the approximate figures quoted herein relate to the temperature at which a substantially bubble-free melt is obtained.

The term "waste oxides" as used herein is intended to define the mixture of oxides present in the waste or effluent resulting from the treatment to remove the uranium and plutonium from irradiated metallic uranium nuclear fuel having a burn-up in excess of 3000 mwd./t. Such waste oxides will comprise fission product oxides, a small proportion of uranium oxide, and oxides resulting from any alloying additions made to the uranium. There will also be present some oxides due to the canning material. Normally these waste oxides will be found in the effluent solution as nitrates, and thus any reference to waste oxides should be interpreted herein as including solutions of the corresponding nitrates.

In a typical case, the waste oxides may be composed chiefly of the following elements:

| | Parts by weight |
|---|---|
| Barium | 28 |
| Cerium | 67 |
| Caesium | 60 |
| Lanthanum | 30 |
| Molybdenum | 78 |
| Neodynium | 97 |
| Palladium | 17 |
| Praseodynium | 30 |
| Rhodium | 12 |
| Ruthenium | 45 |
| Samarium | 16 |
| Strontium | 22 |
| Technetium | 20 |
| Tellurium | 10 |
| Yttrium | 11 |
| Zirconium | 89 |
| Iron | 140 |
| Aluminium | 180 |
| Uranium | 90 |

There will also probably be present smaller amounts of the following elements:

| | |
|---|---|
| Silver | Chromium |
| Europium | Nickel |
| Promethium | Magnesium |
| Rubidium | Silicon |

The exact proportions of these elements in the waste oxides will vary in dependence upon many factors.

The glass forming oxides may be selected from amongst the following oxides:

| | |
|---|---|
| Calcium | Lead |
| Boron | Molybdenum |
| Sodium | Zinc |
| Phosphorus | Aluminium |
| Silicon | Iron |

It should be mentioned that the boron, phosphorus and silicon may be present in the form of borates, phosphates and silicates respectively.

The new composition of matter provided by the present invention is in the form of an entirely fused glass and is preferably contained within a steel vessel. Consequently, therefore, the present invention also provides, as an article of manufacture, a steel vessel containing the new composition of matter as defined above and formed in situ therein.

The invention provides therefore, as a new article of manufacture, a source of radiation which will be substantially homogeneous and which will have a relatively long half-life due to the known long half-lives of the radioactive oxides forming the said waste oxides. However, it may be more convenient to delay forming the glass of the present invention until the waste oxides have had an opportunity to age or decay for a period of some one to five years after removal from the reactor in order to reduce fission product heating unless this is specifically desired. The new article of manufacture can be used as a radiation source providing a mixed spectrum of γ-rays substantially free from β-rays or α-particles and, since the steel vessel will normally be closed, the radiation source will also normally be free from any contamination hazard. In this connection it is to be mentioned that the glass compositions are generally resistant to leaching so that in the unlikely event of perforation of the steel vessel no substantial escape of radioactive material is to be expected. Furthermore, the radioactive decay process will cause self-heating of the new article of manufacture whereby the same may be used as a heat source over a relatively long period, although the heating effect will decay more rapidly than the radioactive effect.

Finally, it will be apparent that the invention provides a means for the disposal of waste oxides insofar as they are transformed into the new article of manufacture and may therefore be disposed of by any suitable means without there being any appreciable risk of the spread of radioactive contamination.

It is to be noted that glasses incorporating waste oxides arising from the treatment of relatively low burn-up fuels or from the treatment of non-metallic fuels are not within the scope of the present invention. At the present time it is impossible to say what the waste oxides resulting from the treatment of non-metallic fuels might be and whether it would be possible to incorporate them in a glass in accordance with the present invention.

In order that the present invention may more readily be understood the process of forming the new article of manufacture will now be as described by way of example and by reference to the accompanying diagrammatic drawing which is a flow sheet.

The new article of manufacture comprises in this embodiment, a stainless steel cylinder 1 of 6 in. inside diameter and 5 ft. long, this cylinder being partially filled in due course with the fused glass composition. To that end the cylinder 1 is housed in a furnace 2 having six independently controlled heating elements and support means 3 for the furnace 2 are capable of raising and lowering the furnace relatively to the cylinder. The top of the cylinder is provided with two conduits 4 and 5 which are connected by couplings respectively to an inlet pipe 6 and a gas offtake pipe 7. A solution of the waste oxides and a slurry of the glass forming oxides, both conveniently in nitric acid, are mixed together and the resultant slurry is fed by the pipe 6 into the cylinder 1. The furnace elements are so controlled that the slurry is heated so as to drive off the water content and so as to break down any nitrates to give the oxides whereby a mass of damp sinter forms initially in the bottom of the cylinder 1. However, as time progresses and as the cylinder becomes hotter, this sinter fuses to give a molten glass filling the lower part of the cylinder. When a sufficient amount of glass has been formed in the cylinder the furnace 2 is moved relative to the cylinder 1 and is raised to the maximum temperature of 1100° C. so as to fuse the remaining sinter in the cylinder and also the dust which is formed by spattering in the upper parts of the cylinder.

It will be apparent that the gas flowing through the offtake pipe 7 will be contaminated by oxide dusts and it is most important that the temperature of this gas should be low enough to prevent this oxide dust sintering and so blocking the pipe. It is for this reason that a lower limit to the melting point range of the glass must be specified, for a sufficient amount of cooling of the gas must take place to prevent this sinter forming in the pipes. Similarly, an upper limit to the melting of the range must be specified, for ordinary and stainless steels cannot be used much above 1100° C. whilst allowing a sufficient safety margin to take into account possible failure of the vessel, bearing in mind the fact that the glass formed in the vessel will be highly radioactive.

The gas offtake pipe 7 is connected by a suitable coupling to the pipe 5a of an identical cylinder 1a which is located in a separate oven 8, this oven being adjusted so as to maintain the temperature of the cylinder 1a at 250° C. The cylinder 1a houses a primary filter element 9 which is designed to extract ruthenium, the most volatile of the waste oxides, and this filter may conveniently comprise iron oxide in a perforated steel container. This filter is kept in place covering the pipe 4a by means of a fusible zinc link. The pipe 4a connects to an offtake gas line 10 which connects to a third cylinder 11 which is housed in an oven 12 at 250° C. and which contains a large secondary filter element 13. The offtake gases passing through the filter 13 are fed to a condenser 14 in which water is removed and thence passed to a nitric oxide absorber tower 15 which is fed by the condensate from the condenser 14 so as to give a nitric acid by-product. The gases from the absorber 15 pass to a caustic scrubber 16, a filter 17 and a vacuum ejector 18 before being exhausted to atmosphere. The ejector 18 serves to maintain a slight negative pressure throughout the apparatus.

When the cylinder 1 has been filled with glass to the prescribed level, the flow of slurry is cut off and, as explained, the furnace is moved relative to the cylinder in order to fuse the remaining sinter in the cylinder. The cylinder is then cooled and removed and forms the new article of manufacture. At the same time the cylinder 1a is cooled and is transferred to the furnace 2, a new cylinder being connected into place in the oven 8. On raising the temperature of the furnace 2 up to the operating temperature, the zinc link supporting the filter 9 will melt at approximately 420° C. to permit this filter to drop to the bottom of the cylinder where it will be encased in the glass that is formed in the cylinder.

In the event that a phosphate glass composition is being used as hereinafter described, some corrosion of the material of the cylinder may take place and therefore it is desirable to protect the inner surface of the cylinder. This may be effected by diffusing aluminium into the internal surface of the cyyinder, subsequently oxidising this aluminium and by adding up to 20% by weight of excess aluminium to the glass composition. Alternatively up to 20% by weight of iron oxide may be added to the glass.

Certain glass compositions forming the new composition of matter of the present invention will now be described in detail. It should be mentioned that the majority of these glass forming systems are three component systems and that a range of compositions give satisfactory glasses melting in the range prescribed. For that reason, the compositions quoted below show the maximum amounts of each of the constituents of the composition and also for each composition an endeavour has been made to indicate the most satisfactory overall composition. The most satisfactory compositions must of course be a compromise based upon the ease of glass formation and the resistance to leaching of the more readily leached constituents. Where possible, therefore, the glasses have been tested for leach resistance and the leaching factors for sodium, potassium and calcium are quoted (where these have been determined) in order to give specific examples out of the wide range of possibilities. It is to be observed that the glass compositions have been specified as having between 20 and 50% by weight of the waste oxides, the lower limit being determined by that below which no sufficient quantity of waste oxides is incorporated in the glass and the upper limit by the tendency of glasses having a high waste oxide content to be unstable. The preferred content of waste oxides is 30–40% by weight.

In the following tables of glasses all compositions are in parts percent by weight, temperatures are in degrees centigrade and leaching factors are in arbitrary units, a high value indicating a very leach resistant glass. A leach factor of 1 is the lower limit of suitability; a factor of 10 is satisfactory; and a factor of 100 is highly desirable.

Finally it should be mentioned that the experiments described herein were carried out on simulated (non-radioactive) or spiked waste oxides, as no sufficient quantity of true waste oxides is yet available, and in many cases potassium was substituted for caesium and rubidium.

EXAMPLE I

*Nepheline Syenite-calcium oxide-boric oxide system*

Nepheline Syenite is a feldspar which has the advantage of forming a gel in acid conditions, this gel drying easily and without spitting. It melts in the region of 1225° C. and its approximate composition by weight percent is

| | |
|---|---|
| Silica | 60 |
| Alumina | 24 |
| Sodium oxide | 10 |
| Potassium oxide | 5 |
| Iron-oxide ⎱ Calcium oxide ⎬ Magnesia ⎰ | 1 |

| Composition | | | | Melting Point | Leach Factors | | |
|---|---|---|---|---|---|---|---|
| Waste Oxides | Nepheline Syenite | Calcium Oxide | Boric Oxide | | Sodium | Potassium | Calcium |
| 22 | <53 | 11.7 | 13.3 | 1,050 | | | |
| 22 | 23.4 | <39 | 15.6 | 1,000 | | | |
| 22 | 23.6 | 7.8 | <46.6 | 1,000 | | | |
| 22 | 50.9 | 3.9 | 23.2 | 1,000 | 10 | 10 | 10 |
| 22 | 39 | 23.4 | 15.6 | 1,000 | 10 | 10 | 10 |
| 22 | 54.6 | 17.6 | 5.8 | 1,050 | 10 | 10 | 10 |
| 30 | <38.5 | 10.5 | 21 | 1,050 | | | |
| 30 | 25 | <25 | 20 | 1,000 | 10 | 10 | 10 |
| 30 | 21 | 14 | 35 | 1,000 | | | |
| 40 | <24 | 12 | 24 | 1,050 | | | |
| 40 | 18 | <24 | 18 | 1,050 | 10 | 3 | 10 |
| 40 | 18 | 12 | <30 | 1,000 | | | |

EXAMPLE II

*Sodium phosphate-calcium oxide-silica system*

In this system, the better glasses are those having low calcium oxide contents.

| Composition | | | | Melting Point | Leach Factors | | |
|---|---|---|---|---|---|---|---|
| Waste Oxides | Sodium Phosphate | Calcium Oxide | Silica | | Sodium | Potassium | Calcium |
| 40 | <54 | 0 | 6 | 900 | | | |
| 40 | 39 | 0 | <21 | 950 | | | |
| 40 | 51 | <9 | 0 | 900 | | | |
| 40 | 42 | 6 | 12 | 950 | | | |
| 40 | 42 | 0 | 18 | 950 | 100 | | 40 |

EXAMPLE III

*Lead oxide-boric oxide-silica system*

| Composition | | | | Melting Point | Leach Factors | | |
|---|---|---|---|---|---|---|---|
| Waste Oxides | Lead Oxide | Boric Oxide | Silica | | Sodium | Potassium | Calcium |
| 20 | <64 | 8 | 8 | 1,000 | | | |
| 20 | 32 | 8 | <40 | 1,050 | | | |
| 20 | 48 | <32 | 0 | 950 | | | |
| 20 | 48 | 16 | 16 | 950 | | | |
| 30 | <49 | 14 | 7 | 1,000 | | 6 | |
| 30 | 28 | 14 | <28 | 1,000 | | 1 | |
| 30 | 35 | <28 | 7 | 950 | | | |

EXAMPLE IV

*Sodium phosphate-lead oxide-boric oxide system*

In this system, only glasses melting below about 950° C. were considered.

| Composition | | | | Melting Point | Leach Factors | | |
|---|---|---|---|---|---|---|---|
| Waste Oxides | Sodium Phosphate | Lead Oxide | Boric Oxide | | Sodium | Potassium | Calcium |
| 40 | <60 | 0 | 0 | 850 | 5 | | |
| 40 | 6 | <30 | <24 | 950 | | | |
| 40 | 48 | 6 | 6 | 900 | 20 | 20 | |
| 40 | 36 | 12 | 12 | 900 | 50 | 20 | |

EXAMPLE V

*Sodium phosphate-lead oxide-silica system*

In this system, only glasses melting below about 950° C. were considered. The presence of lead did not appear to affect the leach factors but slightly increased the mobility of the melts.

| Composition | | | | Melting Point | Leach Factors | | |
|---|---|---|---|---|---|---|---|
| Waste Oxides | Sodium Phosphate | Lead Oxide | Silica | | Sodium | Potassium | Calcium |
| 40 | <57 | 0 | 3 | 900 | ---------- | ---------- | ---------- |
| 40 | <57 | 3 | 0 | 900 | ---------- | ---------- | ---------- |
| 40 | 42 | <15 | 3 | 900 | ---------- | ---------- | ---------- |
| 40 | 48 | 0 | <12 | 950 | 60 | 10 | ---------- |
| 40 | 54 | 0 | 6 | 900 | 80 | 10 | ---------- |

EXAMPLE VI

*Sodium phosphate-sodium silicate system*

In this system, only glasses melting below about 950° C. were considered. The system has the advantage of containing no boron and the glass-forming additions are completely soluble.

| Composition | | | Melting Point | Leach Factors | | |
|---|---|---|---|---|---|---|
| Waste Oxides | Sodium Phosphate | Sodium Silicate | | Sodium | Potassium | Calcium |
| 50 | 50 | 0 | 950 | ---------- | ---------- | ---------- |
| 30 | <70 | 0 | 850 | ---------- | ---------- | ---------- |
| 20 | <70 | 10 | 850 | ---------- | ---------- | ---------- |
| 30 | 40 | <30 | 950 | ---------- | ---------- | ---------- |
| 40 | 55 | 5 | 850 | 10 | 10 | ---------- |

EXAMPLE VII

*Boron phosphate-sodium oxide-silica system*

In this system, only glasses melting below about 950° C. were considered.

| Composition | | | | Melting Point | Leach Factors | | |
|---|---|---|---|---|---|---|---|
| Waste Oxides | Boron Phosphate | Sodium Oxide | Silica | | Sodium | Potassium | Calcium |
| 40 | <42 | 12 | 6 | 900 | 5 | 5 | ---------- |
| 40 | 30 | <24 | 6 | 900 | ---------- | ---------- | ---------- |
| 40 | 27 | 15 | <18 | 900 | ---------- | ---------- | ---------- |

EXAMPLE VIII

*Sodium phosphate-lead oxide-zinc oxide system*

In this system, only glasses melting below about 950° C. were considered.

| Composition | | | | Melting Point | Leach Factors | |
|---|---|---|---|---|---|---|
| Waste Oxides | Sodium Phosphate | Lead Oxide | Zinc Oxide | | Sodium | Potassium |
| 30 | <63 | 0 | 7 | 850 | ---------- | ---------- |
| 30 | <63 | 3.5 | 3.5 | 900 | ---------- | ---------- |
| 30 | 38.5 | <24.5 | 7 | 950 | ---------- | ---------- |
| 30 | 49 | 0 | <21 | 900 | ---------- | ---------- |
| 30 | 45.5 | 7 | <17.5 | 900 | ---------- | ---------- |
| 30 | 42 | 21 | 7 | 900 | 10 | ---------- |

EXAMPLE IX

*Sodium oxide-silica-calcium oxide-boric oxide system*

The glass composition contains a fixed ratio of sodium oxide to silica.

| Composition | | | | | Melting Point | Leach Factors | | |
|---|---|---|---|---|---|---|---|---|
| Waste Oxides | Sodium Oxide | Silica | Calcium Oxide | Boric Oxide | | Sodium | Potassium | Calcium |
| 30 | <9.1 | <36.4 | 14 | 10.5 | 1,000 | ---------- | ---------- | ---------- |
| 30 | 5.6 | 22.4 | <28 | 14 | 950 | ---------- | ---------- | ---------- |
| 30 | 4.9 | 19.5 | 7 | <38.5 | 950 | ---------- | ---------- | ---------- |
| 30 | 8.4 | 33.6 | 10.5 | 17.5 | 1,000 | 4 | 4 | 5 |

EXAMPLE X

*Borax-silica system*

A typical glass from this system contains 40% waste oxides, 40% borax and 20% silica. It melts at approximately 950° C. and has a leach factor of about 0.2 for sodium. This system has been used for the formation of active glasses containing curie levels of $Ru^{103}$ or $Pr^{142}$. The glasses obtained have possessed fairly satisfactory leach characteristics only at low proportions of waste oxides.

EXAMPLE XI

*Molybdenum trioxide-potassium phosphate system*

Glasses in this system, containing 30% waste oxides and up to 40% molybdenum trioxide have been examined and were found to melt below 950° C. Many of the glasses were slightly soluble in water and dilute mineral acids.

EXAMPLE XII

*Sodium phosphate-silica-lead oxide-iron oxide*

This glass was developed from the system of Example V, the iron oxide ($Fe_2O_3$) being added in order to reduce corrosion of the steel container by the phosphate containing glasses.

corrode the steel, except when heated in a non-oxiding atmosphere, but this limitation is not present when the the stainless steel is that known as Immaculate 5.

These experiments were conducted by melting the glass composition in suitable crucibles and holding them at 1050° C. for 20 hours. A specimen of steel was suspended in the melt during this time and at the conclusion of the experiment was examined for corrosion.

The Immaculate 5 steel used in this experiment had the following analysis in percentage by weight: chromium 24%, nickel 21%, carbon 0.14%, silica 1.3%, manganese 0.8%.

The second table in column 9 sets out the percentage composition of certain glasses tested, the molecular percentages corresponding to these weight percentages, and the degree of corrosion of Immaculate 5 steel. It is to be noted that in all cases the corrosion of the steel does not take place if the molecular percentage of phosphorus pentoxide is below the total molecular percentage of waste oxides and aluminium oxide.

These glasses still devitrify on thermal cycling but this

| Composition | | | | | Melting Point | Leach Factor |
|---|---|---|---|---|---|---|
| Waste Oxides | Sodium Phosphate | Lead Oxide | Silica | Ferric Oxide | | Sodium |
| 40.0 | 53.0 | | | 7.0 | 850 | |
| 40 | 47.7 | 5.3 | | 7.0 | 870 | 23 |
| 40 | 42.4 | 10.6 | | 7.0 | 900 | |
| 40 | 42.4 | 7.95 | 2.65 | 7.0 | 880 | |
| 40 | 39.75 | 7.95 | 5.3 | 7.0 | 880 | |
| 40 | 39.75 | 5.3 | 7.95 | 7.0 | 880 | |
| 40 | 42.4 | | 10.6 | 7.0 | 870 | |
| 40 | 47.7 | | 5.3 | 7.0 | 850 | 100 |
| 40 | 45.05 | 5.3 | 2.65 | 7.0 | 860 | 14 |
| 40 | 42.4 | 5.3 | 5.3 | 7.0 | 870 | 110 |
| 40 | 45.05 | 2.65 | 5.3 | 7.0 | 860 | 84 |

EXAMPLE XIII

*Sodium phosphate-silica-alumina*

In the system of Example XII we have found that thermal cycling causes devitrification. In itself this is not a disadvantage but in that particular system it is accompanied by a great increase in the solubility of the glass, the leach factor (sodium) dropping from about 100 to about 0.1 so that there is a possibility that the waste oxides could be leached out.

Moreover we have discovered that the glasses of Example XII are only satisfactory from the corrosion point of view if the molar percentage of phosphorous pentoxide is smaller than the total molar percentage of metallic oxides and waste oxides.

The glasses of the present system were therefore developed and are satisfactory if the total molecular percentage of alumina plus waste oxide is greater than that of the phosphorus pentoxide. The corrosion details being as follows.

devitrification has no effect on their solubility and so is not disadvantageous, the leach factor (sodium) being about 100.

We claim:

1. An article of manufacture comprising a containing vessel of steel of composition by weight; chromium 24%, nickel 21%, carbon 0.14%, silica 1.3%, manganese 0.8% and the rest iron, said vessel having a mass of fused glass therein, the said glass having a composition, by weight, of 42.4 to 47.7% sodium phosphate, 0 to 5.3% silica, 0 to 5.3% lead oxide, 7.0% ferric oxide and 40% the waste oxides derived from the radioactive effluent solution obtained in the processing of a uranium metal fuel irradiated to a burn-up of at least 3000 mwd./t.

2. An article of manufacture comprising a containing vessel of steel of composition by weight; chromium 24%, nickel 21%, carbon 0.14%, silica 1.3%, manganese 0.8%, and the rest iron, said vessel having a mass of fused glass therein, the said glass consisting essentially of silica, alumina, sodium phosphate and the waste oxides derived

| Weight percent | | | | Mole percent | | Percent weight loss of steel |
|---|---|---|---|---|---|---|
| $Na_2O:P_2O_5$ | $SiO_2$ | $Al_2O_3$ | Waste oxides | $P_2O_5$ | $W.O.+Al_2O_3$ | |
| 54.0 | 6.0 | 0 | 40.0 | 31.15 | 30.01 | 10.0 |
| 47.7 | 5.3 | 7.0 | 40.0 | 25.6 | 36.8 | Nil |
| 51.3 | 5.7 | 8.0 | 35.0 | 28.2 | 33.8 | Nil |
| 54.9 | 6.1 | 9.0 | 30.0 | 29.1 | 30.3 | Nil |
| 58.5 | 6.5 | 10.0 | 25.0 | 30.6 | 27.4 | 12.0 |
| 55.8 | 6.2 | 8.0 | 30.0 | 29.8 | 29.3 | (¹) |

¹ Slight corrosion>2%.

It should be noted that in the case of a conventional 18/8/1 stainless steel, the glasses of this invention still from the radioactive effluent solution obtained in the processing of a uranium metal fuel irradiated to a burn-up of at least 3000 mwd./t., the glass including 30–40% by weight of said waste oxides and the molecular percentage of phosphorus pentoxide being smaller than the total molecular percentage of alumina and waste oxides.

References Cited

UNITED STATES PATENTS

| | | | |
|---|---|---|---|
| 3,145,181 | 8/1964 | Courtois et al. | 250—106 XR |
| 3,230,374 | 1/1966 | Jones et al. | 250—106 |
| 3,008,904 | 11/1961 | Johnson et al. | 252—301.1 |
| 3,032,428 | 5/1962 | Ginther | 252—301.1 |
| 3,122,509 | 2/1964 | Handwerk et al. | 264—.5 |
| 3,141,852 | 7/1964 | Dressler et al. | 252—301.1 |
| 3,120,493 | 2/1964 | Clark et al. | 252—301.1 |

OTHER REFERENCES

Atom, "The Disposal of Fission Product Wastes by Fixation in Glass," June 1961; vol. 56, pp. 18–21.

L. DEWAYNE RUTLEDGE, *Primary Examiner.*

BENJAMIN R. PADGETT, CARL D. QUARFORTH,
*Examiners.*

S. J. LECHERT, JR., *Assistant Examiner.*